(12) United States Patent
Takagi et al.

(10) Patent No.: US 8,429,663 B2
(45) Date of Patent: Apr. 23, 2013

(54) ALLOCATING TASK GROUPS TO PROCESSOR CORES BASED ON NUMBER OF TASK ALLOCATED PER CORE, TOLERABLE EXECUTION TIME, DISTANCE BETWEEN CORES, CORE COORDINATES, PERFORMANCE AND DISPOSITION PATTERN

(75) Inventors: Masamichi Takagi, Tokyo (JP); Masayuki Mizuno, Tokyo (JP); Hiroaki Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 655 days.

(21) Appl. No.: 12/529,367

(22) PCT Filed: Feb. 5, 2008

(86) PCT No.: PCT/JP2008/051832
§ 371 (c)(1),
(2), (4) Date: Sep. 24, 2009

(87) PCT Pub. No.: WO2008/108133
PCT Pub. Date: Sep. 12, 2008

(65) Prior Publication Data
US 2010/0100886 A1    Apr. 22, 2010

(30) Foreign Application Priority Data
Mar. 2, 2007  (JP) ................................ 2007-052841

(51) Int. Cl.
*G06F 9/50*    (2006.01)
(52) U.S. Cl.
USPC ......................................... 718/104; 718/100
(58) Field of Classification Search .................. 718/100, 718/104
See application file for complete search history.

(56) References Cited

U.S. PATENT DOCUMENTS

| | | | |
|---|---|---|---|
| 7,992,151 B2 * | 8/2011 | Warrier et al. ................ | 718/104 |
| 7,996,839 B2 * | 8/2011 | Farkas et al. .................. | 718/102 |
| 8,028,286 B2 * | 9/2011 | Fedorova ...................... | 718/102 |
| 2005/0071843 A1 * | 3/2005 | Guo et al. ..................... | 718/101 |
| 2005/0235286 A1 * | 10/2005 | Ballew et al. ................. | 718/100 |
| 2006/0168571 A1 * | 7/2006 | Ghiasi et al. .................. | 717/127 |

(Continued)

FOREIGN PATENT DOCUMENTS

| | | |
|---|---|---|
| JP | 06-028323 A | 2/1994 |
| JP | 06-075786 A | 3/1994 |
| JP | 2001-202397 A | 7/2001 |
| JP | 2006-133995 A | 5/2006 |

OTHER PUBLICATIONS

T. Adam, et al., "A Comparison of List Schedules for Parallel Processing Systems", Communications of the ACM, Dec. 1974, pp. 685-690, vol. 17, Issue 12.

(Continued)

*Primary Examiner* — Meng An
*Assistant Examiner* — Abu Z Ghaffari

(57) ABSTRACT

Even if a multiprocessor includes an uneven performance core, an inoperative core or a core that does not satisfy such a performance as designed but if the contrivance of task allocation can satisfy the requirement of an application to be executed, the multiple processors are shipped. In a task group allocation method for allocating, to a processor having a plurality of cores, task groups included in an application for the processor to execute, a calculation section measures performances and disposition patterns of the cores, generates a restricting condition associating the measured performances and disposition patterns of the cores with information indicating whether the application can be executed, and, with reference to the restricting condition, reallocates to the cores, the task groups that have previously been allocated to the cores.

16 Claims, 9 Drawing Sheets

U.S. PATENT DOCUMENTS

| | | | |
|---|---|---|---|
| 2006/0218428 A1* | 9/2006 | Hurd | 713/500 |
| 2007/0033425 A1* | 2/2007 | Clark | 713/320 |
| 2007/0074011 A1* | 3/2007 | Borkar et al. | 712/227 |
| 2007/0294681 A1* | 12/2007 | Tuck et al. | 717/149 |

OTHER PUBLICATIONS

H. Kasahara, et al., "Practical Multiprocessor Scheduling Algorithms for Efficient Parallel Processing", IEEE Trans. on Computers, Nov. 1984, pp. 1023-1029, vol. C-33, No. 11.

Y. Kwok, et al., "Static Scheduling Algorithms for Allocating Directed Task Graphs to Multiprocessors", ACM Computing Surveys, Dec. 1999, vol. 31, No. 4, pp. 407-471.

Iijima et al., "Task Scheduling Method Considered the Communication Time by Critical Path—The Application to Various Kinds of Network Topology.", The Transactions of the Institute of Electronics, Information and Communication Engineers, Dec. 1, 2001, p. 1624, vol. J84-D-I, No. 12, pp. 1623-1634.

\* cited by examiner

ALLOCATING TASK GROUPS TO PROCESSOR CORES BASED ON NUMBER OF TASK ALLOCATED PER CORE, TOLERABLE EXECUTION TIME, DISTANCE BETWEEN CORES, CORE COORDINATES, PERFORMANCE AND DISPOSITION PATTERN

This application is the National Phase of PCT/JP2008/051832, filed Feb. 5, 2008, which is based upon and claims the benefit of priority based on prior Japanese Patent Application No. 2007-052841 (filed Mar. 2, 2007) under the Paris Convention, the entire contents of which are incorporated herein by reference.

TECHNICAL FIELD

The present invention relates to a task group allocation method for allocating task groups to a processor with a plurality of cores, a task group allocation device, a task group allocation program, a processor to which task groups are allocated by a task group allocation method, a processor including a task group allocation device, and a computer including a task group allocation device.

BACKGROUND ART

A processor core has versatility for covering various applications. A multi-core processor in which a plurality of processor cores are mounted on one chip provides versatility and can achieve high performance and low power consumption. Further, along with progress in miniaturization of a semiconductor, manufacture of the multi-core processor is enabled.

However, along with the progress in miniaturization of a semiconductor, dispersion in devices on a chip have become relatively large, as well as, breakdown of the devices has increased.

As a result, dispersion in parameters, such as operating frequency and power consumption per a processor core become large. In addition, breakdown occurring per a processor core has increased.

CITATION LIST

Patent Literature

{PTL 1} JP-A-2006-133995
{PTL 2} JP-A-2001-202397

Non Patent Literature

{NPL 1} Thomas L. Adam, K. M. Chandy, J. R. Dickson, "A comparison of list schedules for parallel processing systems", Communications of the ACM, Volume 17, Issue 12, pp. 685-690, December 1974.
{NPL 2} H. Kasahara, S. Narita, "Practical Multiprocessor Scheduling Algorithms for Efficient Parallel Processing", IEEE Trans. on Computers, Vol. C-33, No. 11, pp. 1023-1029, November 1984.
{NPL 3} Yu-Kwong Kwok and Ishfaq Ahmad, Static Scheduling Algorithms for Allocating Directed Task Graphs to Multiprocessors, ACM Computing Surveys, Vol. 31, No. 4, December 1999.
{NPL 4} Tetsuo Mori, "Mathematical Programming-optimization method", Kyoritsu shuppan, 1st to 47th sections, 1994.

SUMMARY OF INVENTION

Technical Problem

In an example of a conventional technique, a single uniform criterion is used to conduct a shipping test for all the cores on all the chips. For example, all the cores on all the chips are required to operate at 500 MHz. Then, cores that do not satisfy this criterion or that have been broken down, if exist, are discarded. In this criterion, chip yield rate is obtained by raising "yield rate of one core" to the power of "number of cores", so that when dispersion among cores increases, the number of shipping chips rapidly decreases.

In another example of a conventional technique, a redundant core is provided, and a chip in which the number of cores that are not broken down and that satisfy a single uniform criterion exceeds a certain threshold is shipped. For example, a chip in which 7 out of 8 cores normally operate is shipped. In this example, cores perform communication, and there is a restriction on execution time of each task, so that a faulty core cannot be replaced by the redundant core under specific allocation of tasks. That is, a chip may be discarded depending on the allocation of tasks.

In still another example of a conventional technique, cores that do not satisfy a criterion or cores that are broken down are made non-active, and a chip having the defective cores is shipped as low-grade product. For example, a chip in which 7 out of 8 cores normally operate is sold at lower price than a chip in which all 8 cores normally operate. In this case, a large amount of high-grade products need to be produced in order to ensure a sufficient amount of the low-grade product. Therefore, it can be said that this method can be applied only to a high volume market. Further, in this method, the low-grade product needs to be in demand. Therefore, it can be said that this method can be applied only to a multigrade market like a desktop PC CPU market.

There is known a conventional technique relating to a change of task allocation after manufacture (refer to, e.g., PTL 1). This technique works as follows in order to avoid malfunction or breakdown at the execution time. That is, at the execution time, the operating temperature of each core is measured, and tasks are allocated to processors starting from the lowest temperature processor to the highest temperature processor in order of priority. After the allocation, the operating temperature is estimated and, when there exist any core in which the estimated temperature exceeds a caution temperature, a task allocated to the core is removed therefrom followed by termination of the core. In the case where a higher-priority task is removed, reallocation is made such that the higher-priority task is allocated to a core having the lowest temperature by replacing a task assigned to the core having the lowest temperature with the higher-priority task.

In this technique, however, the cores are allocated in order of priority to respective tasks as described above, so that a plurality of tasks are related to one another, and task allocation cannot be made in such a way that the requirement of an application program that the plurality of tasks satisfy the restriction on execution time is satisfied. Therefore, this method cannot be utilized for chip sorting.

In addition, the allocation is made on a per-one task basis, it takes a long time to complete the reallocation. Further, when the reallocation is made by removing the task one by one, a plurality of tasks linked through an execution time restriction cannot be migrated simultaneously. Therefore, in this method, optimum allocation of the task groups cannot be achieved.

There is known another conventional technique relating to the task allocation (refer to, e.g., PTL 2). In this conventional technique, an IP is allocated for designing to each task based on a predefined specification (although the "IP" originally refers to LSI design data that is reusable and marketable, the meaning thereof is expanded to include LSI function model, LSI hardware model, and LSI software). As an allocation method, an existing method is utilized. That is, allocation is made as follows. First, an application (task groups), a performance requirement, and an architecture template are given. Then, a hardware IP or software IP that has been selected from given IP group is allocated to each task. This allocation processing is repeated for all the tasks. After that, it is determined whether the performance requirement is satisfied or not. When the requirement is not satisfied, the hardware IP or software IP to be allocated to a task for which the requirement is not satisfied is changed, and then it is determined once again whether the performance requirement is satisfied or not. When the requirement is satisfied, information representing the IP and the task to which the IP has been assigned is output.

In order to use the above conventional technique in performing task allocation according to the performance of manufactured chips and sorting chips, one of the following two methods needs to be carried out. One is a method in which the above procedure is performed any number of times, a large number of allocations are previously output, the performances and disposition patterns of the cores with which the application can be executed are extracted from the allocations, applicable core performances and core disposition patterns are searched for after manufacture, and the found core performances and core disposition patterns are used for the allocation and sorting. Another one is a method in which the above method is applied after manufacture and a chip for which a possible allocation exists is shipped.

Assuming that a large number of allocations are previously output, the allocation is output while changing a condition. Therefore, the number of conditions is increased to increase the processing time. For example, task allocation is made with a task 0 tied to PE0 so as to output one core performance and one core disposition pattern, and a chip satisfying this is shipped. Then, task allocation is made with the task 0 tied to PE1. This procedure is repeated.

Further, the latter method, in which the above conventional technique is applied after manufacture and a chip is shipped or discarded depending on presence/absence of possible allocation, has the following problem. That is, processing of determining whether the allocation is possible or not needs to be repeated while changing a condition, taking a long time to complete the sorting.

Further, in the method in which the cores are allocated to the tasks, a method of selecting the core is so simple that allocation often becomes impossible, resulting in a decrease in the number of chips that are not discarded. That is, since a suitable core for one task is selected in a short-sighted manner, a wrong selection is likely to be made.

Further, the IP (core) is allocated to the task, that is, allocation is not made in units of a group, meaning that a configuration in which an IP (core) group is allocated to a task group is not employed, so that the core may excessively be allocated in the allocation step. This may result in absence of core, making it impossible to make the allocation, leading to a decrease in the number of chips that are not discarded.

Further, when the core is excessively allocated without consideration of a fact that the IP (core) and its parameter cannot freely be selected after manufacture, an allocation change cannot often be made in an allocation change step, leading to a decrease in the number of chips that are not discarded.

Further, when a condition (e.g., core to which the task is allocated) change is made, the level of the change cannot be limited to that in which the allocation is possible, so that the configuration change may be made in a simple manner. As a result, a large number of allocation attempts are often made under a condition that the allocation is impossible, thereby taking a long time for reaching a possible allocation.

In the case where the conventional technique is applied to the selection of cores, any of the following methods need to be performed.

One is a method in which the allocation output by the conventional task allocation technique is used for determination on whether the product is suitable for shipping. This method has a problem that the number of chips that are not discarded is decreased. This method is, in other words, a method in which one distribution (performance and disposition of core) is output by the method of the conventional technique and only a chip that satisfies the distribution is shipped. This means that the restricting condition used in this method is stricter than that used in the present invention. As a result, the number of chips that are not discarded is decreased.

Another method is a method in which the method of the conventional technique is applied a number of times so as to previously output a large amount of distributions. In this method, the allocation is output while changing a condition. Therefore, the number of conditions is increased to increase the processing time. For example, task allocation is made with a task 0 tied to PE0 so as to output one distribution, and a chip satisfying this is shipped. Then, task allocation is made with the task 0 tied to PE1. This procedure is repeated.

Still another method is a method in which the task allocation method is applied after manufacture. In this method, the number of chips that are not discarded is decreased. Further, it takes a long time to increase the number of chips that are not discarded. That is, processing of determining whether the allocation is possible or not needs to be repeated while changing a condition. Further, when a condition (e.g., core to which the task is allocated) change is made, the level of the change cannot be limited to that in which the allocation is possible, so that the configuration change may be made in a simple manner. As a result, a large number of allocation attempts are often made under a condition that the allocation is impossible.

An object of the present invention is therefore to enable shipment of multiprocessors that satisfy the requirement of an application to be executed through a contrivance of task allocation even if the multiprocessor includes an uneven performance core, an inoperative core or a core that does not satisfy such a performance as designed and to perform sorting of the multiprocessor at high speed. Another object is to provide a task group allocation method, a task group allocation device, a task group allocation program, a processor, and a computer capable of achieving the above object.

Solution to Problem

According to a first aspect of the present invention, there is provided a task group allocation method that allocates, to a processor having a plurality of cores, task groups included in an application executed by the processor, comprising: a step of measuring performances of the cores and disposition patterns of the cores after manufacture and before shipment of the chip or when a breakdown is detected by zero-performance of the chip at the time of use; a step of generating a restricting condition that associates the measured core performances and core disposition patterns with information indicating whether the application can be executed; and a step of, with reference to the restricting condition, reallocating, to the cores, the task groups with their order in the application that have previously been allocated to the cores.

Further, according to a second aspect of the present invention, there is provided a task group allocation device that allocates, to a processor having a plurality of cores, task groups included in an application executed by the processor, comprising: a unit for measuring performances of the cores and disposition patterns of the cores after manufacture and before shipment of the chip or when a breakdown is detected by zero-performance of the chip at the time of use, for generating a restricting condition that associates the measured core performances and core disposition patterns with information indicating whether the application can be executed; and a unit for reallocating, to the cores, the task groups with their order in the application that have previously been allocated to the cores, with reference to the restricting condition.

Further, according to a third aspect of the present invention, there is provided a non-transitory computer-readable medium, on which a task group program is recorded, said program causes a computer to function as a task group allocation device that allocates, to a processor having a plurality of cores, task groups included in an application executed by the processor: said task group allocation device comprising: a unit for measuring performances of the cores after manufacture and before shipment of the chip or when a breakdown is detected by zero-performance of the chip at the time of use and disposition patterns of the cores, generating a restricting condition that associates the measured core performances and core disposition patterns with information indicating whether the application can be executed; and a unit for reallocating, to the cores, the task groups with their order in the application that have previously been allocated to the cores, with reference to the restricting condition.

Further, according to a fourth aspect of the present invention, there is provided a processor to which task groups are allocated by the above task group allocation method.

Further, according to a fifth aspect of the present invention, there is provided a semiconductor device sorting method whether a semiconductor device having a plurality of cores can be shipped is determined using the above task group allocation method.

Further, according to a sixth aspect of the present invention, there is provided a processor including the above task group allocation device.

Further, according to a seventh aspect of the present invention, there is provided a computer including the above task group allocation device.

Advantageous Effects of Invention

According to the present invention, it is possible to increase the number of chips that can be shipped.

This is because that a contrivance is made in allocation of the tasks, thereby allowing some of the chips that have been discarded by a single uniform criterion applied throughout all the cores on all the chips to satisfy the application requirement required for shipment.

DESCRIPTION OF EMBODIMENTS

A preferred embodiment for practicing the present invention will be described below with reference to the accompanying drawings.

Figure 1:
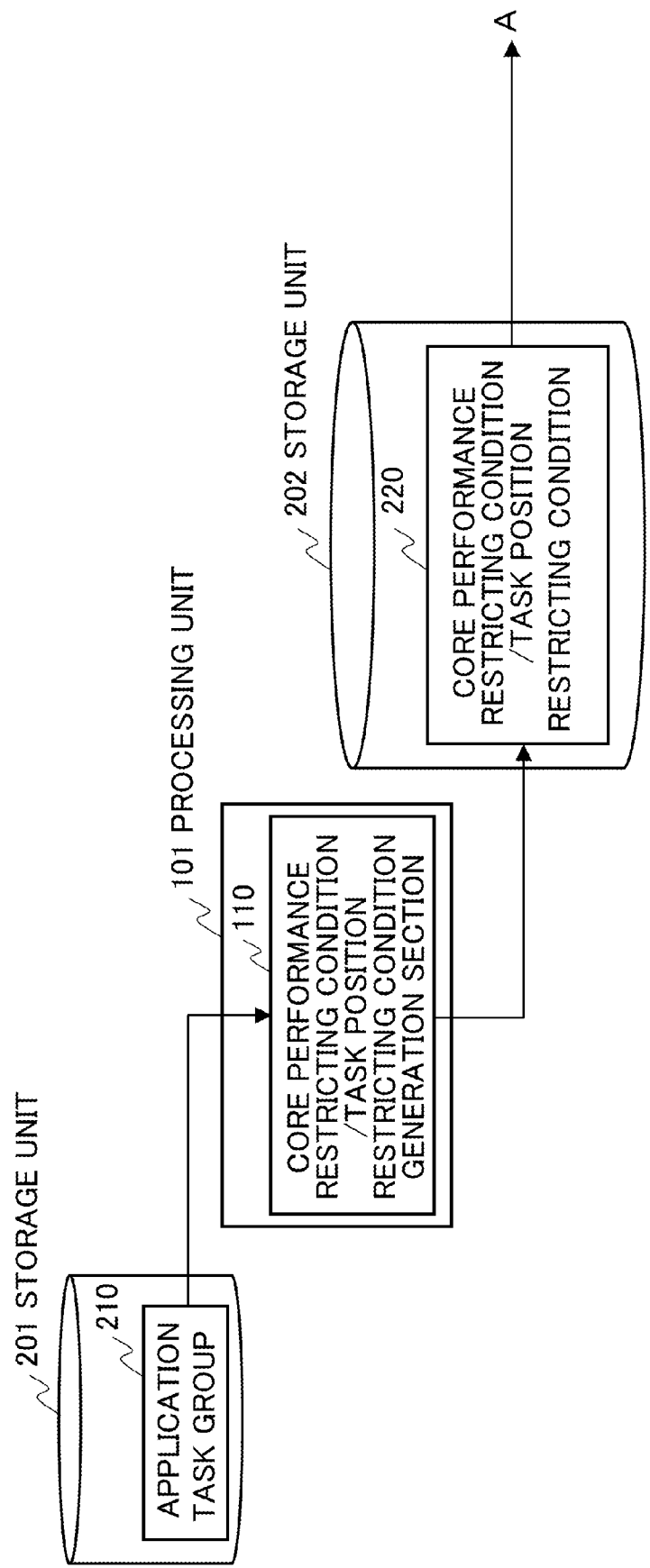
FIG. 1 A block diagram showing the first half of a configuration of an allocation device according to an embodiment of the present invention.
Figure 2:
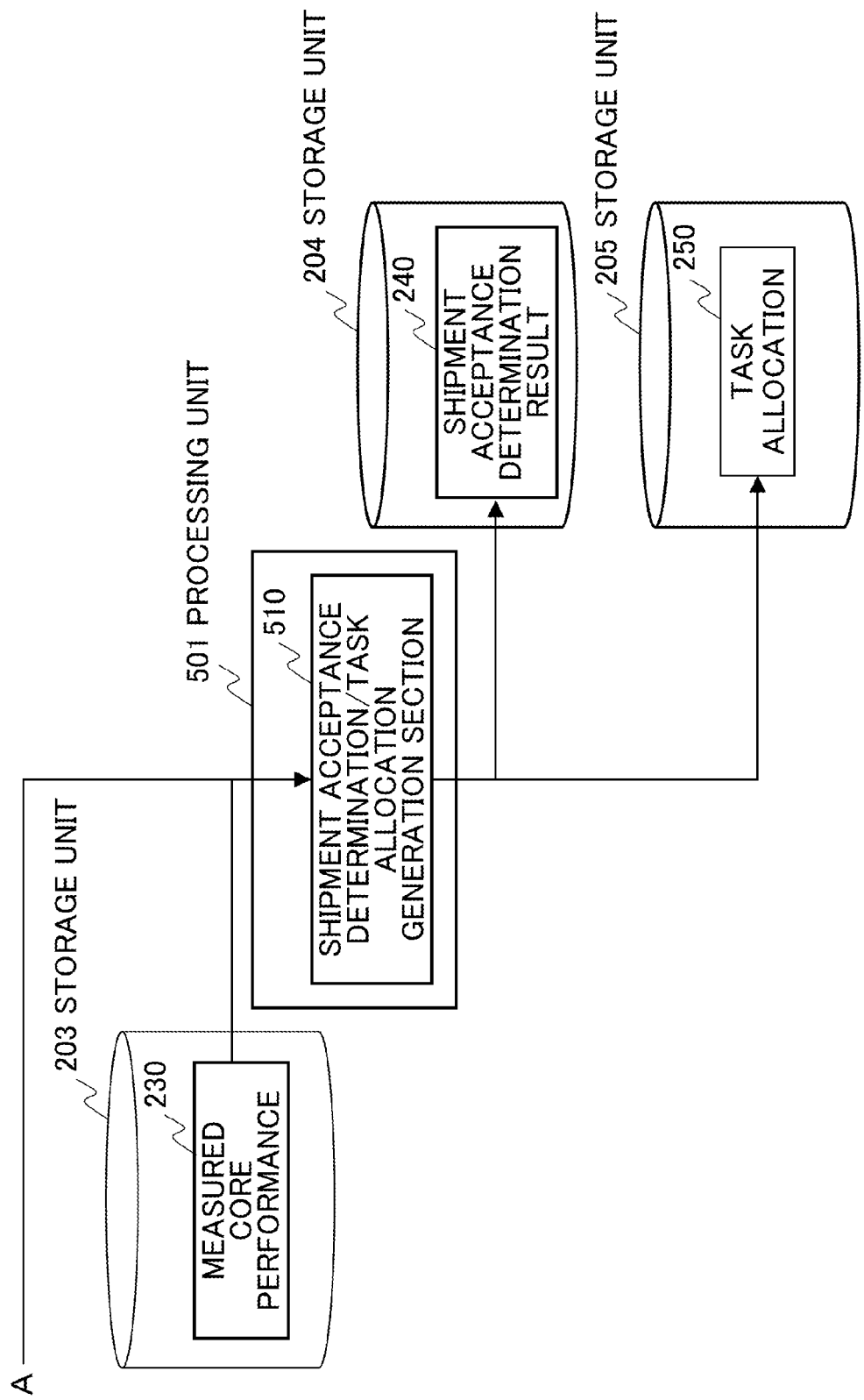
FIG. 2 A block diagram showing the latter half of a configuration of the allocation device according to the embodiment of the present invention.

FIGS. 1 and 2 are block diagrams each showing a configuration of a task allocation device according to an embodiment of the present invention.

Referring to FIG. 1, an application task group 210 is stored in a storage unit 201.

A core performance restricting condition/task position restricting condition generation section 110 for generating a core performance restricting condition and a core position restricting condition is provided in a processing unit 101. It is only necessary for the processing unit 101 to generate the core performance restricting condition and task position restricting condition, and the core performance restricting condition/task position restricting condition generation section 110 may be divided into a core performance restricting condition section and a task position restricting condition generation section.

A core performance restricting condition/task position restricting condition 220 is stored in a storage unit 202.

A measured core performance (maximum operating frequency) 230 of each core on a chip is stored in a storage unit 203.

A shipment allowance determination/task allocation generation section 510 is provided in a processing unit 501. It is only necessary for the processing unit 501 to output a shipment allowance determination result and a task allocation result, and the shipment allowance determination/task allocation generation section 510 may be divided into a shipment allowance determination section and a task allocation generation section.

A shipment allowance determination result 240 is stored in a storage unit 204.

A task allocation 250 indicating the allocation of the task groups to the cores on a chip suitable for shipping is stored in a storage unit 205. The storage unit 205 may be included in the relevant chip or another chip.

Figure 3:
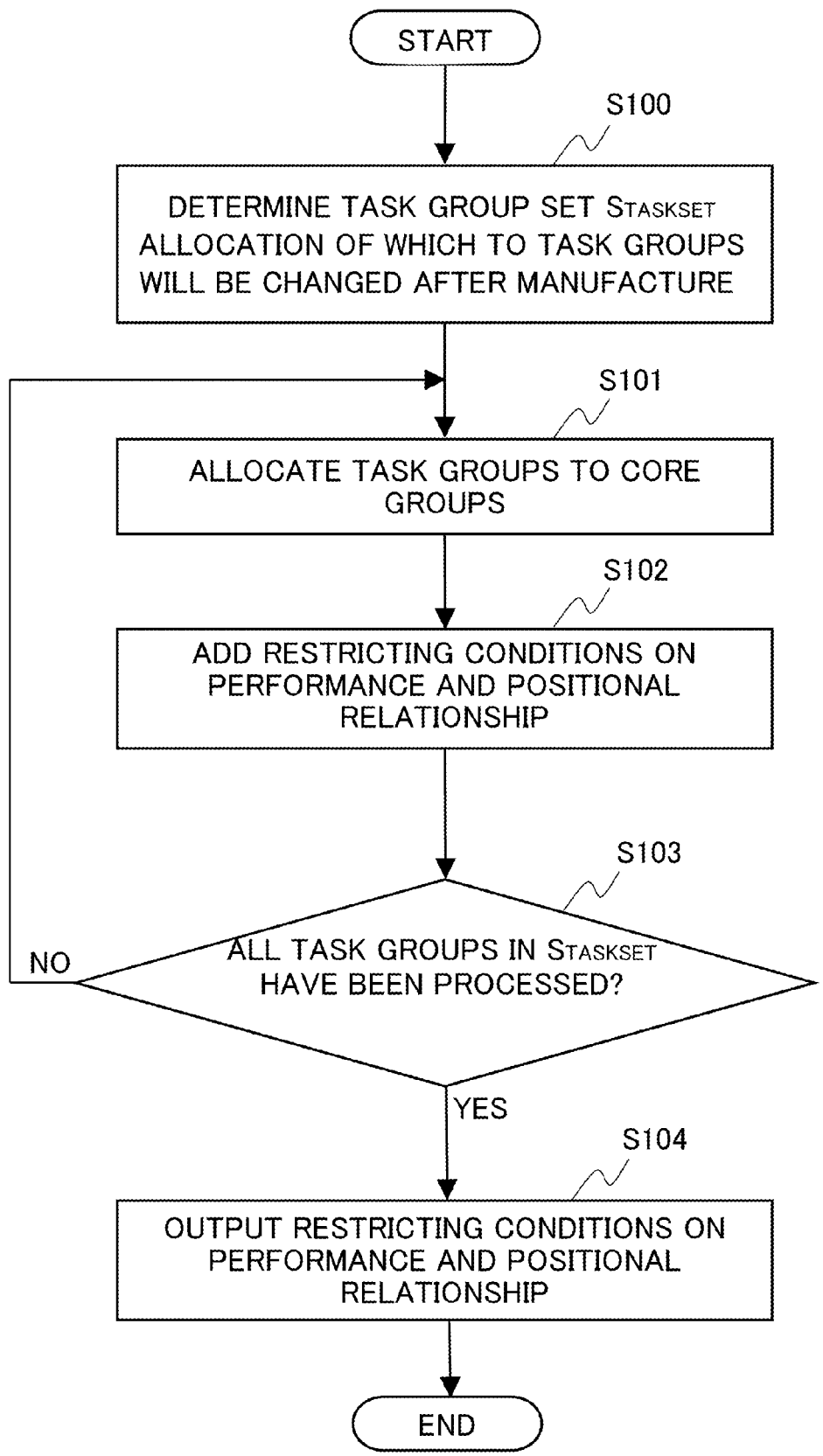
FIG. 3 A flowchart showing the first half of an allocation method according to the embodiment of the present invention.

With reference to FIG. 3, operation of the core performance restricting condition/task position restricting condition generation section 110 will be described below.

In S100, A task group set $S_{taskset}$, whose allocation to core groups is changed after manufacture, is determined. In the case where a task group that determines the strictest restricting condition has been identified, this task group is used as the $S_{taskset}$. In the case where a task group that determines the strictest restricting condition has not been identified, all the task groups to be executed are set as the $S_{taskset}$.

In S101, task groups are allocated to core groups. Any of the methods of the conventional techniques can be applied to this allocation. For example, allocation methods disclosed in NPLs 1 to 3 can be used.

A task group refers to a set of tasks that are executed simultaneously. In the present invention, the task group allocated to same core is set as a unit of task migration.

In S102, a result of the allocation is used to represent a core performance restricting condition and a task position restricting condition of task groups by a linear inequality so as to add these restricting conditions.

More concretely, the core performance restricting condition and task position restricting condition of task groups are represented by a linear inequality including: parameters each indicating measured core performance; constants each indicating a task completion time point (unit: cycle); parameters each indicating distance between tasks; constants each indicating a data transfer time; constants each indicating a tolerance time for inter-task communication; and constants each indicating a tolerance time for a task completion time point. The details of the above will be described later. In the case where data is passed from task A to task B, the tolerance time for communication between tasks A and B refers to a difference between the time point obtained by adding a time required for the communication to a completion time point of task A and the time point at which task B is started.

The processings of S101 to S102 are applied to all the task groups in the $S_{taskset}$ (S103).

In S104, the linear inequality representing the core performance restricting condition and task position restricting condition of task groups is output.

The processing of S102, in which the core performance restricting condition and task position restricting condition of task groups are represented by a linear inequality, will be described with reference to FIGS. 4 and 5.

Figure 4:
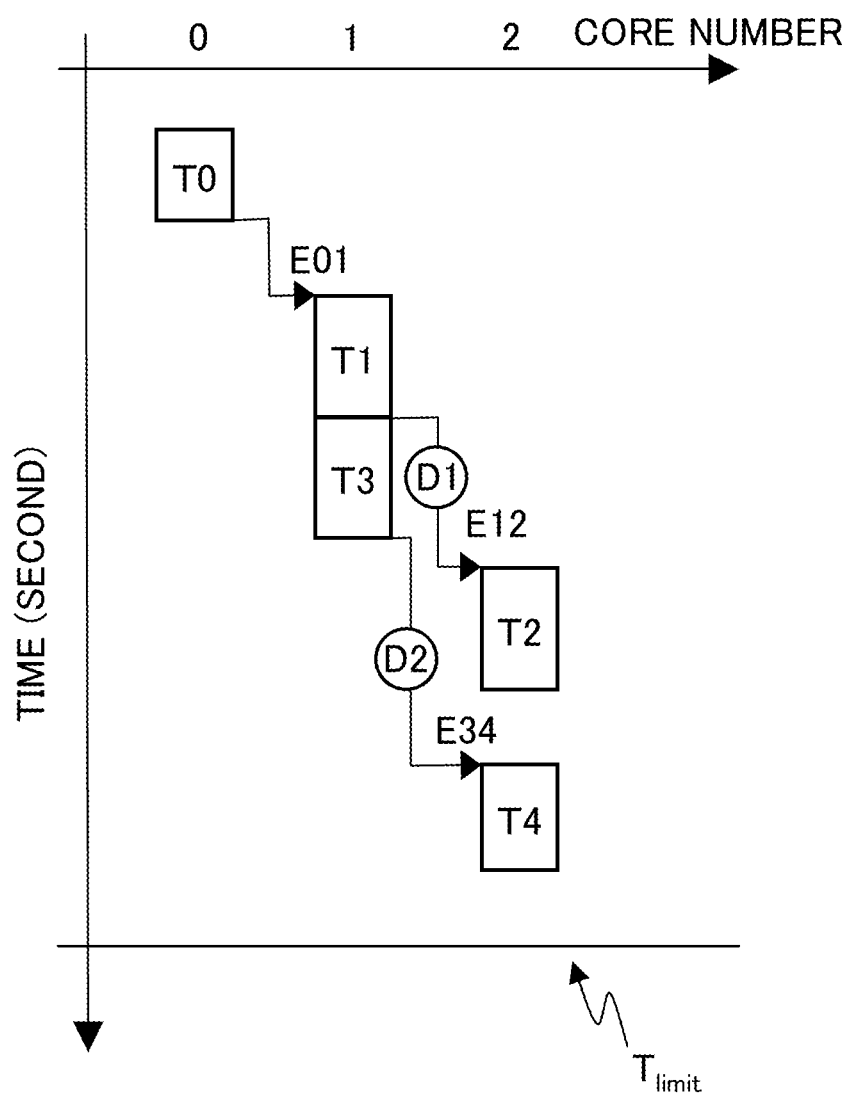
FIG. 4 A first diagram showing a time relationship in inter-task communication.

Assume that five tasks are allocated to three cores as shown in FIG. 4. Task T0 constitutes a first task group, task T1 and task T3 constitute a second task group, and task T2 and task T4 constitute a third task group. The first task group is allocated to a core 0, second task group is allocated to a core 1, and third task group is allocated to a core 2.

Each directed link represents a dependence relationship. For example, E12 represents data dependence in which data D1 defined by the task T1 is referred to by the task T2, and E34 represents data dependence in which data D2 defined by the task T3 is referred to by the task T4.

The tolerance time for communication between tasks T1 and T2 is defined by a difference between the time point obtained by adding a time required for communication between cores 1 and 2 to a finish time point of task T1 and the time point at which the task T2 is started.

Similarly, the tolerance time for communication between tasks T3 and T4 is defined by a difference between the time point obtained by adding a time required for communication between cores 1 and 2 to a finish time point of the task T3 and the time point at which the task T4 is started.

Under such a condition, the execution time is determined. For a task having the latest execution time (task T4 in the example shown in FIG. 4), the execution time limit is represented by using the tolerance time for the task completion time point. That is, the tolerance time for the task completion time point is determined such that the finish time of task T4 does not exceed a constant Tlimit (see FIG. 4) representing the restriction time point.

A simultaneous linear equation represents the following.

When the operating frequency of core 1 is reduced, generation of D1 is delayed. However, the operating frequency may be reduced to a level at which the time point obtained by adding the transfer time to the time point at which D1 is generated does not exceed the start time point of T2.

Further, when the operating frequency of core 1 is reduced, generation of D2 is delayed. However, the operating frequency may be reduced to a level such that the time point obtained by adding the transfer time to the generation time point of D2 does not exceed the start time point of T4.

The generation time point (unit: second) of D1 is represented by the completion time point (unit: cycle) of T1 and core operating frequency.

When the operating frequency of core 2 is reduced, completion of T4 is delayed. However, the operating frequency may be reduced to a level at which the completion time point of T4 does not exceed the execution time limit.

The completion time point (unit: second) of T4 is represented by the completion time point (unit: cycle) of T4 and core operating frequency.

The above description can be expressed as follows, using a concrete image.

A box T1 is extended downward. The operating frequency of core 1 can be reduced to a level at which the time point obtained by adding the communication time to the lower edge of the box T1 does not exceed the upper edge of a box T2. Similarly, a box T3 is extended downward. The operating frequency of core 1 can be reduced to a level at which the time point obtained by adding the communication time to the lower edge of the box T3 does not exceed the upper edge of a box T4.

The following expression can also be used. The box T1 is extended both upward and downward, and the operating frequency of core 1 can be reduced to a level at which the time point obtained by adding the communication time to the lower edge of the box T0 does not exceed the upper edge of the box T1, or at which the time point obtained by adding the communication time to the lower edge of the box T1 does not exceed the upper edge of the box T2. However, the extension of the box both in the upward and downward directions gives influence on the range within which the boxes (of adjacent cores) can be extended, thus requiring simultaneous consideration of tasks allocated to a plurality of cores, which results in complexity of expressions.

That is, the task start time point is made unchanged, and only the task finish time point is made changeable depending on the operating frequency. With this configuration, a simpler expression can be obtained as compared to a case where not only the task finish time point but also the start time point is made changeable.

Figure 5:
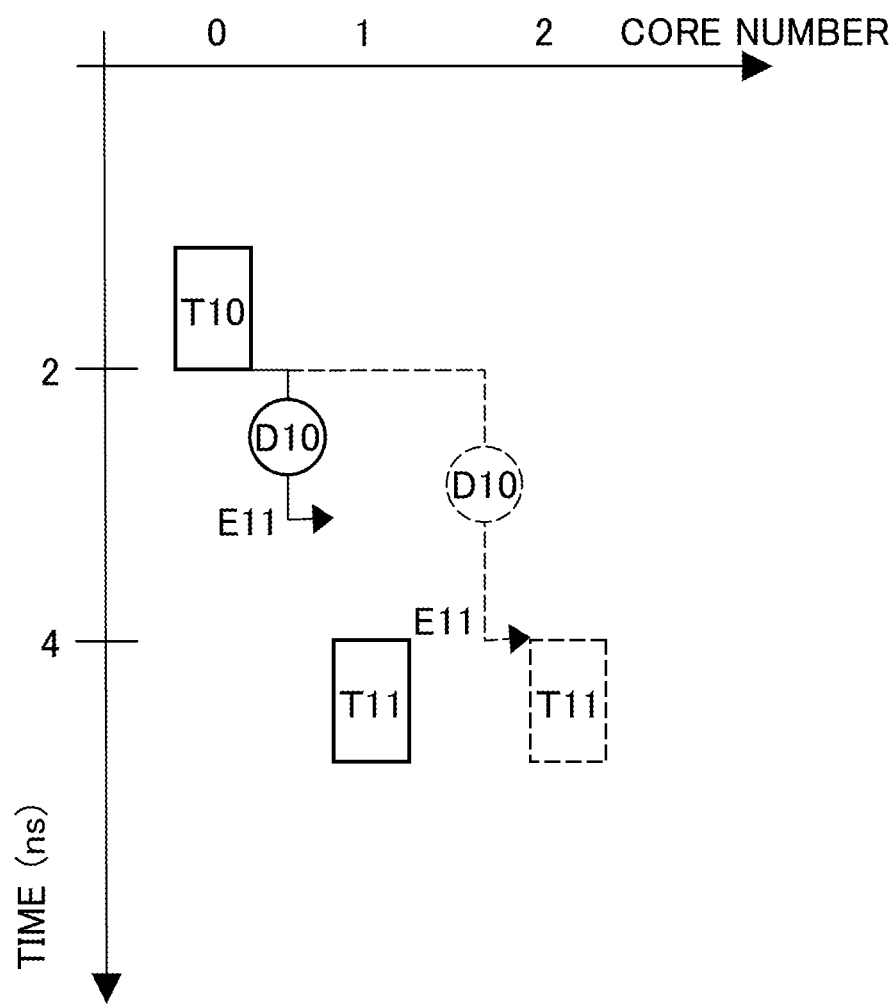
FIG. 5 A second diagram showing a time relationship in inter-task communication.

Here, as shown in FIG. 5, assumed is a multi-core in which three cores are arranged in a row.

It is assumed that the communication time between core 0 and core 1 is 1ns, the communication time between core 1 and core 2 is 1ns, and the communication time between core 0 and core 2 is 2 ns. Further, it is assumed that two tasks are allocated to two cores, as shown in FIG. 5. Each directed link represents a dependence relationship. For example, E11 represents data dependence in which data D10 defined by the task T10 is referred to by the task T11. The finish time point of task T10 is set at 2 ns, and the start time point of T11 is set at 4 ns. Considered is a case where this allocation is changed after manufacture.

What needs to be expressed using a linear inequality is as follows. Tasks must be allocated to cores that are disposed within a distance in which the communication finish time point does not exceed the restriction time point. In this case, as shown in FIG. 5, the task T10 and task T11 may be allocated respectively to the core 0 and core 1, or to the core 0 and core 2. However, in the case where the operating frequency of core 0 is reduced, a case may occur in which the task T10 and task T11 need to be allocated to cores (e.g., core 0 and core 1) the distance between which is short.

The distance between cores after the allocation change is represented by Manhattan distance (sum of an absolute distance along X coordinate and an absolute distance along Y coordinate).

Here, considered is a case where a task group that has been allocated to given cores in S101 is migrated to other cores. Using a linear inequality, a condition to be satisfied after the allocation change is represented.

A parameter which becomes 1 in the case where the coordinates of a core is (a, b), after allocation change, to which a task group (e.g., T1 and T3 that have been allocated to the core 1 (see FIG. 4)) having been allocated to a core i (i is core name) in the initial allocation is allocated, is represented as $P_{i,a,b}$. It is assumed that the cores are disposed like two-dimensionally disposed tiles, the number of which in the horizontal direction is Dx and the number of which in the vertical directions is Dy. Further, it is assumed that the X coordinate after allocation change is integer and ranges from 0 to Dx−1. Similarly, it is assumed that the Y coordinate after allocation change is integer and ranges from 0 to Dy−1.

The following equations represent that tasks constituting one task group are not distributed to a plurality of cores but the one task group has been allocated to one core.

$$P_{i,0,0} \in \{0,1\}, P_{i,1,0} \in \{0,1\}, P_{i,2,0} \in \{0,1\}, \ldots,$$
$$P_{i,Dx-1,Dy-1} \in \{0,1\} \quad \text{[Numeral 1]}$$

$$P_{i,0,0} + P_{i,1,0} + P_{i,2,0} + \ldots + P_{i,Dx-1,Dy-1} = 1 \quad \text{[Numeral 2]}$$

The following equations represent that tasks constituting one task group has not been allocated to one core or one task group has been allocated to one core.

$$P_{0,0,0} + P_{1,0,0} + P_{2,0,0} + \ldots + P_{M,0,0} \leq 1$$

$$\ldots$$

$$P_{0,Dx-1,Dy-1} + P_{1,Dx-1,Dy-1} + P_{2,Dx-1,Dy-1} + \ldots + P_{M,Dx-1,Dy-1} \leq 1 \quad \text{[Numeral 3]}$$

The X coordinate after allocation change of a task group allocated to core i is represented as $V_{i,x}$. In the following equation, $V_{i,x}$ is created from $P_{i,0,0}, P_{i,0,1}, \ldots$.

$$V_{i,x} = 0*P_{i,0,0} + 0*P_{i,0,1} + 0*P_{i,0,2} + \ldots$$

$$+ 0*P_{i,0,Dy-1} + 1*P_{i,1,0} + 1*P_{i,1,1} + 1*P_{i,1,2} + \ldots$$

$$+ 1*P_{i,1,Dy-1} + \ldots$$

$$+ (D_x-1)*P_{i,Dx-1,0}(D_x-1)*P_{i,Dx-1,1}(D_x-1)*P_{i,Dx-1,2} \ldots$$

$$+ (D_x-1)*P_{i,Dx-1,Dy-1} \quad \text{[Numeral 4]}$$

The Y coordinate after allocation change is represented as $V_{i,y}$. In the following equation, $V_{i,y}$ is created from $P_{i,0,0}, P_{i,0,1}, \ldots$.

$$V_{i,y} = 0*P_{i,0,0} + 0*P_{i,1,0} + 0*P_{i,2,0} + \ldots$$

$$+ 0*P_{i,Dx-1,0} + 1*P_{i,0,1} + 1*P_{i,1,1} + 1*P_{i,2,1} + \ldots$$

$$+ 1*P_{i,Dx-1,1} + \ldots$$

$$+ (D_y-1)*P_{i,0,Dy-1}(D_y-1)*P_{i,1,Dy-1}(D_y-1)*P_{i,2,Dx-1} \ldots$$

$$+ (D_y-1)*P_{i,Dx-1,Dy-1} \quad \text{[Numeral 5]}$$

The Manhattan distance (sum of an absolute distance along X coordinate and an absolute distance along Y coordinate) between a core m and a core n is represented as $H_{m,n}$. In the following equations, the Manhattan distance is generated from $V_{m,x}, V_{m,y}, V_{n,x},$ and $V_{n,y}$.

$$+(V_{m,x}-V_{n,x})+(V_{m,y}-V_{n,y}) \leq H_{m,n}$$

$$+(V_{m,x}-V_{n,x})-(V_{m,y}-V_{n,y}) \leq H_{m,n}$$

$$-(V_{m,x}-V_{n,x})+(V_{m,y}-V_{n,y}) \leq H_{m,n}$$

$$-(V_{m,x}-V_{n,x})-(V_{m,y}-V_{n,y}) \leq H_{m,n} \quad \text{[Numeral 6]}$$

An example of the Manhattan distance is as follows.

In the case where cores are two-dimensionally arranged on a tile pattern and the cores communicate with one another using a mesh-like network, the Manhattan distance between a core positioned at (x1, y1) and a core positioned at (x2, y2) is represented by the following equation.

$$|x1-x2|+|y1-y2| \quad \text{[Numeral 7]}$$

Next, a restriction that the finish time point of data delivery between cores does not exceed the restriction time point is represented by the following equation, in consideration of the performance of cores and positional relationship between tasks after allocation change is applied to a task group that has been allocated to core i in the initial allocation. The measured performance of a core positioned at (x,y) coordinates just after manufacturing is represented by a parameter $Ffab_{x,y}$.

$T_{i,p}$ represents the time point (unit: cycle) at which the p-th task of the task group that has been allocated to core i completes. The completion time point (unit: second) in the case where the task group that has been allocated to core i is executed on a core positioned at (x,y) coordinates is represented by $T_{i,p}/Ffab_{x,y}$. Lhop represents the delay time of one hop (1-hop) in the network. The assumed operating frequency of core i at the initial allocation is represented by $Fpre_i$. The Manhattan distance between a task group that has been allocated to core i and a task group that has been allocated to core j at the initial allocation is represented by $Hpre_{i,j}$. The Manhattan distance between a task group that has been allocated to core i and a task group that has been allocated to core j after allocation change is represented by $H_{i,j}$. $H_{i,j}$ and $Hpre_{i,j}$ are included in only equations for cores between which inter-task communication is made. $S_{i,p,j,q}$ represent the tolerance time (unit: second) for communication between the p-th task that has been allocated to core i and the q-th task that has been allocated to core j. One equation exists per one inter-task communication.

$$(T_{i,p}/Ffab_{0,0}+H_{i,j}*L_{hop})*P_{i,0,0}+(T_{i,p}/Ffab_{1,0}+H_{i,j}*L_{hop})*P_{i,1,0}$$

$$+(T_{i,p}/Ffab_{2,0}+H_{i,j}*L_{hop})*P_{i,2,0}+\ldots+(T_{i,p}/Ffab_{Dx-1,Dy-1}+H_{i,j}*L_{hop})P_{Dx-1,Dy-1}$$

$$\leq (T_{i,p}/F_{pre_i}+H_{pre_j}*L_{hop})+S_{i,p,j,q}$$

$$\ldots \quad \text{[Numeral 8]}$$

A restriction that the task group that has been allocated to core i in the initial allocation satisfies the execution time requirement is represented by the following equation. $S'_{i,p}$ represents the tolerance time (unit: second) for the task finish time period of the p-th task that has been allocated to core i. One equation exists per one task having the latest finish time point in the order determined by data communication. In an instance as shown in FIG. 4, an equation for T2 and an equation for T4 exist.

$$(T_{i,p}/Ffab_{0,0})*P_{i,0,0}+(T_{i,p}/Ffab_{1,0})*P_{i,1,0}+(T_{i,p}/Ffab_{2,0})*P_{i,2,0}+$$

$$\ldots +(T_{i,p}/Ffab_{Dx-1,Dy-1})*P_{i,Dx-1,Dy-1} \leq (T_{i,p}/F_{prei})+ S'_{i,p}$$

$$\ldots$$ [Numeral 9]

Figure 6:
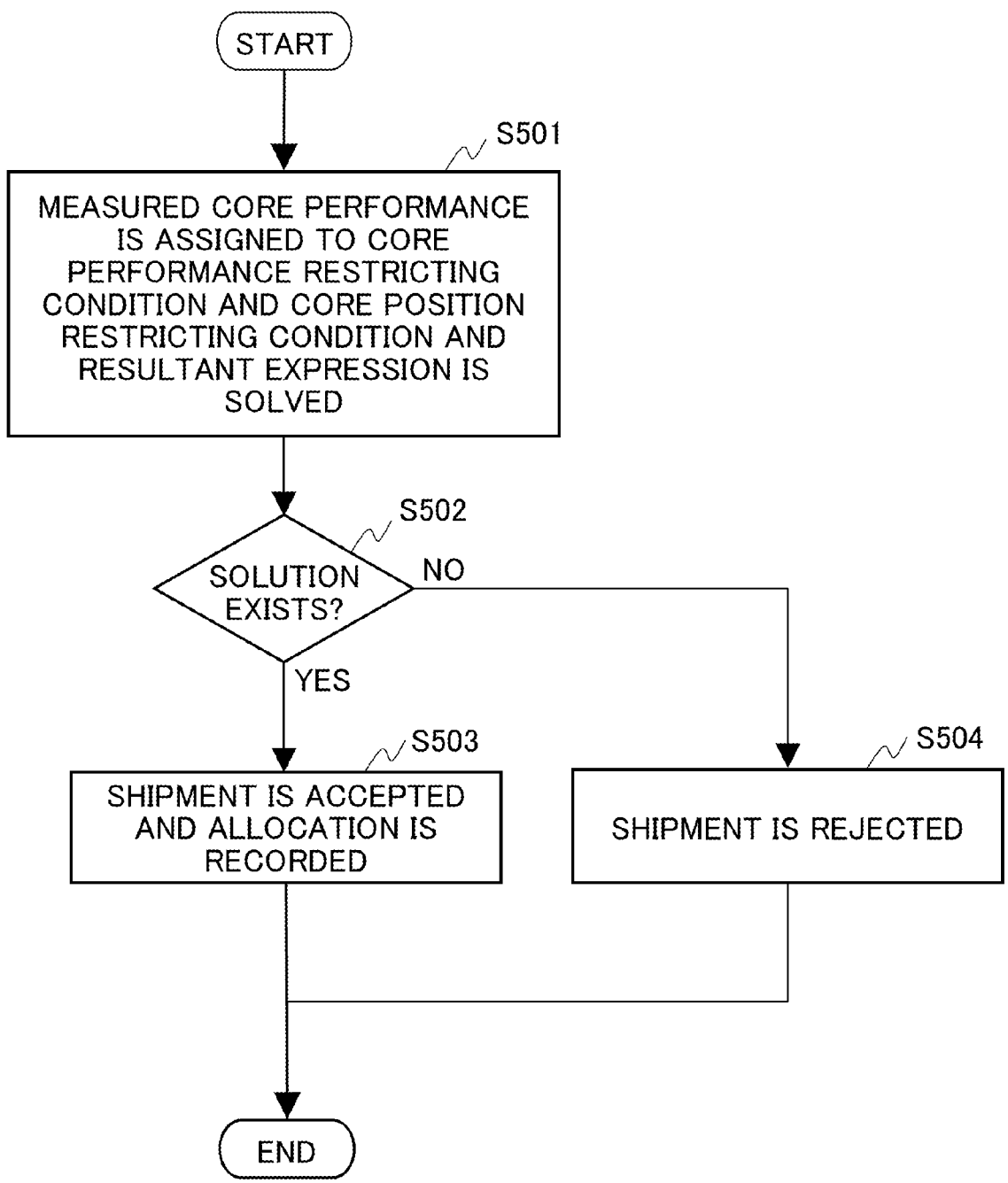
FIG. 6 A flowchart showing the second half of the allocation method according to the embodiment of the present invention.

Next, operation of the shipment allowance determination/task allocation generation section 510 will be described with reference to FIG. 6.

In S501, the measured performance values of cores are assigned to a linear inequality representing the core performance restricting condition and task positional relationship restricting condition and the resultant inequality is solved. In this case, a method in which a simplex method (refer to, e.g., NPL 4) is applied to an integer solution or a branch and bound method can be utilized for obtaining a solution.

In S502, it is determined whether a solution exists or not.

In S503, since a solution exists, shipment is allowed, and a task allocation with respect to cores is output. The allocation can be obtained from the solution.

In S504, since no solution exists, shipment is rejected.

Next, processing of S501 of FIG. 6 will be described.

The performance (e.g., operating frequency) of each core is measured after manufacture of a chip. In the case where a given core has been broken down and does not operate, the performance thereof is set at zero. This measured value is assigned to $Ffab_{x,y}$. Then, the inequalities created in S104 constitute a simultaneous first order inequality (a simultaneous linear inequality). A problem (feasibility problem) of whether there exists a solution satisfying the simultaneous linear inequality is solved. In general, no solution is obtained, or one solution is obtained. The obtained solution corresponds to a new task group allocation to cores that satisfy application requirement.

This problem can be solved as a integer programming problem of, e.g., the following equation in which an equation for maximization (or minimization) is set to be rendered meaningless.

$$\text{maximize: } P_{i,0,0}+P_{i,1,0}+\ldots +P_{i,Dx-1,Dy-1}$$ [Numeral 10]

In this case, a method in which a simplex method is applied to an integer solution or a branch and bound method can be utilized for obtaining a solution.

As an application example, a configuration may be employed in which an adjacent 2×2 cores are treated as one cluster to reduce the number of parameters in the simultaneous linear inequality so as to reduce the time required to solve the feasibility problem. In this case, the simultaneous linear inequality is solved using the cluster in place of the core. In this case, the minimums of the performance values of the cores in a cluster are used as the performance values of that cluster that are measured after manufacture.

According to the present embodiment, even when a small number of low-performance cores which do not satisfy a given criterion exist on a chip, if a large number of high-performance cores which satisfy the given criterion exist on the chip, then it is possible to allow the requirement of an application to be executed to be satisfied, by allocating task groups having a looser execution time restriction to the low-performance cores and allocating task groups having a stricter execution time restriction to the high-performance cores.

The application to be executed is composed of a set of tasks, and the tasks communicate with one another for data definition and data reference. The communication occurs at the task start time/end time. The granularity of the task is not especially limited. For example, a process, a thread, a command string, or a command may be adopted as the granularity. Then, the execution time restriction is acquired. For example, the execution time restriction that a given work (e.g., speech recognition processing) should be completed within a given time (e.g., 1ms).

The application mentioned here is an application of an assembling manufacturer that manufactures a device incorporating a given chip on which the application is designed to work. The requirement by the assembling manufacturer is that the chip can execute the application while satisfying a given requirement. Conventionally, it has been determined using a loose criterion whether a chip can be shipped or not; while in the present invention, it can be determined using a stricter criterion whether a chip can be shipped or not. That is, a contrivance is made in allocation of the tasks in the application to the cores so as to increase a chip that satisfies the application requirement. As a result, it is possible not to discard the chips that would have been discarded conventionally.

Further, as a restricting condition that associates the core performance/core disposition with information indicating whether the application satisfies the requirement, a linear inequality representing a condition that the application satisfies the requirement may be used. More concretely, this is a linear inequality representing the core performance and positional relationship between task groups. The core performance mentioned here is a property required for each core to execute a given task and includes, e.g., core operating frequency and core power consumption.

Then, after manufacture of a chip, the performance of each core on the chip is measured. The measured performance is assigned to the simultaneous linear inequality so as to obtain a solution. When a solution has been obtained, the relevant chip can be shipped. In the case where the chip can be shipped, the obtained solution of the simultaneous linear inequality represents the allocation of the application task groups with respect to cores that satisfies the requirement. The allocation is recorded on the chip to be shipped.

In the case where a breakdown is detected at the time of use, the disposition pattern may be changed so as to isolate the broken cores from the chip. That is, at the time of use, the linear inequality is solved with the operating frequency of the broken-down chip set at zero, thereby obtaining a disposition pattern in which the task groups are not allocated to the broken-down core.

According to the present embodiment, the following advantages can be obtained.

A first advantage is that the number of chips that can be shipped can be increased. The reason is as follows.

That is, this is because that a contrivance is made in allocation of the task to thereby allow some of the chips, that would have been discarded by a single uniform criterion applied throughout all the cores on all the chips, to satisfy the application requirement required for shipment.

Further, this is because that a contrivance is made in allocation of the task, thereby allowing some of the chips that would have been discarded even using a redundant core to be shipped.

Further, this is because that a contrivance is made in allocation of the task to thereby allow some of the chips, that would have been discarded in markets where the amount of high-grade products for sale is small or where there is no demand of low-grade products, to be shipped.

Further, this is because that by using a simultaneous linear inequality, it is possible to inclusively search for the allocation allowing the chip to be shipped.

A second advantage is that the sorting can be made at high speed. This is because that it is possible to effectively search for the allocation allowing the chip to be shipped by using a simultaneous linear inequality.

EXAMPLE

Figure 7:
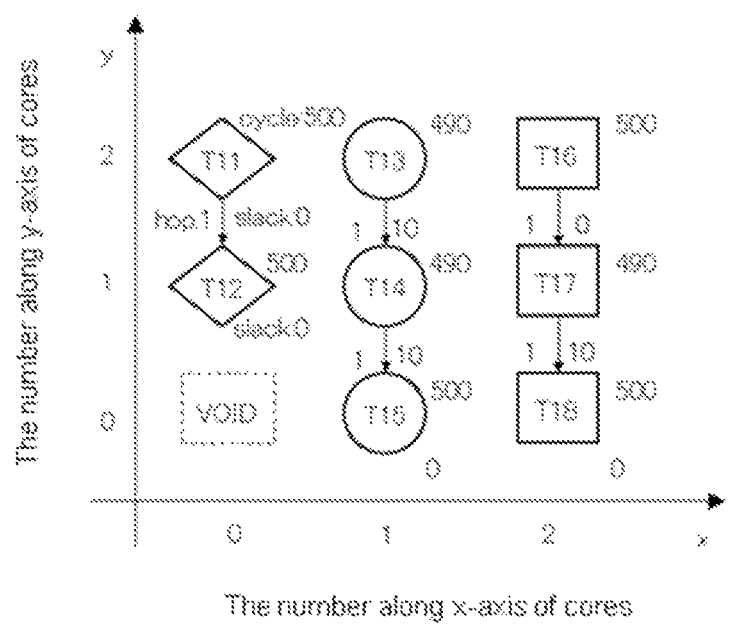
FIG. 7 A view showing parameters and initial allocation of tasks to cores in an example of the present invention.

A multi-core processor in which nine cores are arranged in 3×3 tile pattern is assumed as shown in FIG. 7. It is assumed that cores communicate with one another using a mesh-like network. All the cores are designed to operate at 1,000 MHz.

In step S101, task groups are scheduled. The scheduled result is as shown in FIG. 7. The positions in the two-dimensional space indicate cores to which the task groups are allocated. For example, the task T11 is allocated to the core (0, 2).

In step S102, task processing amount (shown at upper right of each task in FIG. 7 (unit: cycle)), Manhattan distance (shown at left side of each line connecting tasks of FIG. 7) in inter-task communication (shown as each line connecting tasks of FIG. 7), the tolerance time between tasks (shown at right side of each line (unit: ns)) and the tolerance time of the last task (shown at lower right of each of the last tasks (unit: ns)) are obtained.

In step S103, all the task groups have been allocated, and the flow advances to step S104.

In step S104, the And-condition between the conditions obtained in step S102 is output. Simultaneous linear inequalities as the output result are as follows.

$P_{11,0,0} \in \{0,1\}, P_{11,1,0} \in \{0,1\}, P_{11,2,0} \in \{0,1\},$ $P_{11,0,1} \in \{0,1\}, P_{11,1,1} \in \{0,1\}, P_{11,2,1} \in \{0,1\},$ $P_{11,0,2} \in \{0,1\}, P_{11,1,2} \in \{0,1\}, P_{11,2,2} \in \{0,1\},$ $P_{12,0,0} \in \{0,1\}, P_{12,1,0} \in \{0,1\}, P_{12,2,0} \in \{0,1\},$ $P_{12,0,1} \in \{0,1\}, P_{12,1,1} \in \{0,1\}, P_{12,2,1} \in \{0,1\},$ $P_{12,0,2} \in \{0,1\}, P_{12,1,2} \in \{0,1\}, P_{12,2,2} \in \{0,1\},$

...

$P_{18,0,0} \in \{0,1\}, P_{18,1,0} \in \{0,1\}, P_{18,2,0} \in \{0,1\},$ $P_{18,0,1} \in \{0,1\}, P_{18,1,1} \in \{0,1\}, P_{18,2,1} \in \{0,1\},$ $P_{18,0,2} \in \{0,1\}, P_{18,1,2} \in \{0,1\}, P_{18,2,2} \in \{0,1\},$ [Numeral 11]

$P_{11,0,0} + P_{11,1,0} + P_{11,2,0} + P_{11,0,1} + P_{11,1,1} + P_{11,2,1} + P_{11,0,2} + P_{11,1,2} + P_{11,2,2} = 1$ $P_{12,0,0} + P_{12,1,0} + P_{12,2,0} + P_{12,0,1} + P_{12,1,1} + P_{12,2,1} + P_{12,0,2} + P_{12,1,2} + P_{12,2,2} = 1$

...

$P_{18,0,0} + P_{18,1,0} + P_{18,2,0} + P_{18,0,1} + P_{18,1,1} + P_{18,2,1} + P_{18,0,2} + P_{18,1,2} + P_{18,2,2} = 1$ [Numeral 12]

$P_{11,0,0} + P_{12,0,0} + P_{13,0,0} + P_{14,0,0} + P_{15,0,0} + P_{16,0,0} + P_{17,0,0} + P_{18,0,0} \leq 1$ $P_{11,1,0} + P_{12,1,0} + P_{13,1,0} + P_{14,1,0} + P_{15,1,0} + P_{16,1,0} + P_{17,1,0} + P_{18,1,0} \leq 1$ $P_{11,2,0} + P_{12,2,0} + P_{13,2,0} + P_{14,2,0} + P_{15,2,0} + P_{16,2,0} + P_{17,2,0} + P_{18,2,0} \leq 1$ $P_{11,0,1} + P_{12,0,1} + P_{13,0,1} + P_{14,0,1} + P_{15,0,1} + P_{16,0,1} + P_{17,0,1} + P_{18,0,1} \leq 1$ $P_{11,1,1} + P_{12,1,1} + P_{13,1,1} + P_{14,1,1} + P_{15,1,1} + P_{16,1,1} + P_{17,1,1} + P_{18,1,1} \leq 1$ $P_{11,2,1} + P_{12,2,1} + P_{13,2,1} + P_{14,2,1} + P_{15,2,1} + P_{16,2,1} + P_{17,2,1} + P_{18,2,1} \leq 1$ $P_{11,0,2} + P_{12,0,2} + P_{13,0,2} + P_{14,0,2} + P_{15,0,2} + P_{16,0,2} + P_{17,0,2} + P_{18,0,2} \leq 1$ $P_{11,1,2} + P_{12,1,2} + P_{13,1,2} + P_{14,1,2} + P_{15,1,2} + P_{16,1,2} + P_{17,1,2} + P_{18,1,2} \leq 1$ $P_{11,2,2} + P_{12,2,2} + P_{13,2,2} + P_{14,2,2} + P_{15,2,2} + P_{16,2,2} + P_{17,2,2} + P_{18,2,2} \leq 1$ [Numeral 13]

$V_{11,x} = 0*P_{11,0,0} + 0*P_{11,0,1} + 0*P_{11,0,2} + 1P_{11,1,0} + 1*P_{11,1,1} + 1*P_{11,1,2} + 2*P_{11,2,0} + 2*P_{11,2,1} + 2*P_{11,2,2}$ $V_{12,x} = 0*P_{12,0,0} + 0*P_{12,0,1} + 0*P_{12,0,2} + 1P_{12,1,0} + 1*P_{12,1,1} + 1*P_{12,1,2} + 2*P_{12,2,0} + 2*P_{12,2,1} + 2*P_{12,2,2}$

...

$V_{18,x} = 0*P_{18,0,0} + 0*P_{18,0,1} + 0*P_{18,0,2} + 1P_{18,1,0} + 1*P_{18,1,1} + 1*P_{18,1,2} + 2*P_{18,2,0} + 2*P_{18,2,1} + 2*P_{18,2,2}$ [Numeral 14]

$V_{11,y} = 0*P_{11,0,0} + 0*P_{11,1,0} + 0*P_{11,2,0} + 1*P_{11,0,1} + 1*P_{11,1,1} + 1*P_{11,2,1} + 2*P_{11,0,2} + 2*P_{11,1,2} + 2*P_{11,2,2}$ $V_{12,y} = 0*P_{12,0,0} + 0*P_{12,1,0} + 0*P_{12,2,0} + 1*P_{12,0,1} + 1*P_{12,1,1} + 1*P_{12,2,1} + 2*P_{12,0,2} + 2*P_{12,1,2} + 2*P_{12,2,2}$

...

$V_{18,y} = 0*P_{18,0,0} + 0*P_{18,1,0} + 0*P_{18,2,0} + 1*P_{18,0,1} + 1*P_{18,1,1} + 1*P_{18,2,1} + 2*P_{18,0,2} + 2*P_{18,1,2} + 2*P_{18,2,2}$ [Numeral 15]

$+(V_{11,x} - V_{12,x}) + (V_{11,y} - V_{12,y}) \leq H_{11,12}$ $+(V_{11,x} - V_{12,x}) - (V_{11,y} - V_{12,y}) \leq H_{11,12}$ $-(V_{11,x} - V_{12,x}) + (V_{11,y} - V_{12,y}) \leq H_{11,12}$ $-(V_{11,x} - V_{12,x}) - (V_{11,y} - V_{12,y}) \leq H_{11,12}$ $+(V_{13,x} - V_{14,x}) + (V_{13,y} - V_{14,y}) \leq H_{13,14}$ $+(V_{13,x} - V_{14,x}) - (V_{13,y} - V_{14,y}) \leq H_{13,14}$ $-(V_{13,x} - V_{14,x}) + (V_{13,y} - V_{14,y}) \leq H_{13,14}$ $-(V_{13,x} - V_{14,x}) - (V_{13,y} - V_{14,y}) \leq H_{13,14}$ $+(V_{14,x} - V_{15,x}) + (V_{14,y} - V_{15,y}) \leq H_{14,15}$ $+(V_{14,x} - V_{15,x}) - (V_{14,y} - V_{15,y}) \leq H_{14,15}$ $-(V_{14,x} - V_{15,x}) + (V_{14,y} - V_{15,y}) \leq H_{14,15}$ $-(V_{14,x} - V_{15,x}) - (V_{14,y} - V_{15,y}) \leq H_{14,15}$ [Numeral 16]

$+(V_{16,x} - V_{17,x}) + (V_{16,y} - V_{17,y}) \leq H_{16,17}$ $+(V_{16,x} - V_{17,x}) - (V_{16,y} - V_{17,y}) \leq H_{16,17}$ $-(V_{16,x} - V_{17,x}) + (V_{16,y} - V_{17,y}) \leq H_{16,17}$ $-(V_{16,x} - V_{17,x}) - (V_{16,y} - V_{17,y}) \leq H_{16,17}$ $+(V_{17,x} - V_{18,x}) + (V_{17,y} - V_{18,y}) \leq H_{17,18}$ $+(V_{17,x} - V_{18,x}) - (V_{17,y} - V_{18,y}) \leq H_{17,18}$ $-(V_{17,x}-V_{18,x})+(V_{17,y}-V_{18,y}) \leq H_{17,18}$ $-(V_{17,x}-V_{18,x})+(V_{17,y}-V_{18,y}) \leq H_{17,18}$ [Numeral 17]

$500/Ffab_{0,0}*P_{11,0,0}+500/Ffab_{1,0}*P_{11,1,0}+$
$500/Ffab_{2,0}*P_{11,2,0}+$ $\ldots+500/Ffab_{2,2}*P_{11,2,2}+H_{11,12}*10 \leq 500/1+1*10+0$ $490/Ffab_{0,0}*P_{13,0,0}+490/Ffab_{1,0}*P_{13,1,0}+$
$490/Ffab_{2,0}*P_{13,2,0}+$ $\ldots+490/Ffab_{2,2}*P_{13,2,2}+H_{13,14}*10 \leq 490/1+1*10+10$ $490/Ffab_{0,0}*P_{14,0,0}+490/Ffab_{1,0}*P_{14,1,0}+$
$490/Ffab_{2,0}*P_{14,2,0}+$ $\ldots+490/Ffab_{2,2}*P_{14,2,2}+H_{14,15}*10 \leq 490/1+1*10+10$ $500/Ffab_{0,0}*P_{16,0,0}+500/Ffab_{1,0}*P_{16,1,0}+$
$500/Ffab_{2,0}*P_{16,2,0}+$ $\ldots+500/Ffab_{2,2}*P_{16,2,2}+H_{16,17}*10 \leq 500/1+1*10+0$ $490/Ffab_{0,0}*P_{17,0,0}+490/Ffab_{1,0}*P_{17,1,0}+$
$490/Ffab_{2,0}*P_{17,2,0}+$ $\ldots+490/Ffab_{2,2}*P_{17,2,2}+H_{17,18}*10 \leq 490/1+1*10+0$ [Numeral 18]

$500/Ffab_{0,0}*P_{12,0,0}+500/Ffab_{1,0}*P_{12,1,0}+$
$500/Ffab_{2,0}*P_{12,2,0}+$ $\ldots+500/Ffab_{2,2}*P_{12,2,2} \leq 500/1+0$ $500/Ffab_{0,0}*P_{15,0,0}+500/Ffab_{1,0}*P_{15,1,0}+$
$500/Ffab_{2,0}*P_{15,2,0}+$ $\ldots+500/Ffab_{2,2}*P_{15,2,2} \leq 500/1+0$ $500/Ffab_{0,0}*P_{18,0,0}+500/Ffab_{1,0}*P_{18,1,0}+$
$500/Ffab_{2,0}*P_{18,2,0}+$ $\ldots+500/Fab_{2,2}*P_{18,2,2} \leq 500/1+0$ [Numeral 19]

In the above equations, it is assumed that it takes 10 ns to transmit data at each hop. Further, in the case where each core operates at 1,000 MHz, it takes 1ns to complete one cycle. The unit of Ffab is GHz.

It is assumed that all the cores operate at 1,000 MHz.

Figure 8:
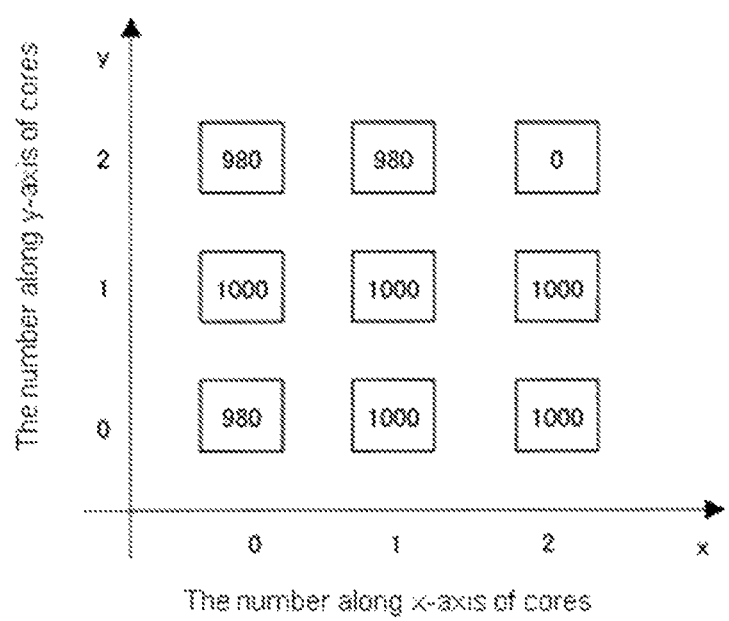
FIG. 8 A view showing measured operating speed in the example of the present invention.

In step S501, a maximum value of the operating frequency of each core on a chip after manufacture is measured. FIG. 8 shows the maximum values of operating frequency of respective cores. For example, a core positioned at (0,2) operates at up to 980 MHz. A core positioned at (2,2) is broken down and cannot operate. The maximum operating frequencies are assigned to Ffab of the simultaneous linear inequality.

In step S502, it is determined whether there is a solution of the simultaneous linear inequalities. A branch and bound method can be used for the determination. For example, the determination can be made according to the following procedure: the simultaneous linear inequalities are regarded as an integer programming problem; it is further regarded as a linear programming problem; a grid point in the vicinity of a solution of the linear programming problem is obtained; and whether the grid point satisfies the conditions of the integer programming problem is determined as a solution of the integer programming problem.

In this case, solutions exist.

One of the solutions is as follows.

$P_{11,2,1}=1, P_{12,2,0}=1$ $P_{13,1,2}=1, P_{14,0,2}=1, P_{15,1,1}=1,$ $P_{16,0,1}=1, P_{17,0,0}=1, P_{18,1,0}=1$ [Numeral 20]

others are all 0

Figure 9:
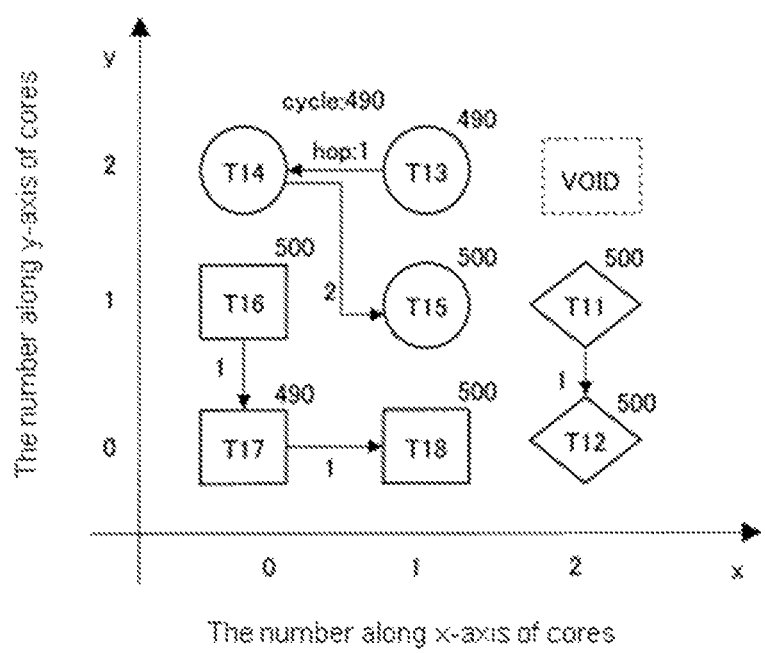
FIG. 9 A view showing a result of reallocation of tasks to cores in the example of the present invention.

FIG. 9 shows the allocation of respective task groups to cores which corresponds to the above solution. That is, changing the initial allocation as shown in FIG. 7 to the allocation as shown in FIG. 9 allows the relevant chip to be shipped. In step S503, it is determined that this chip can be shipped, and the allocation is recorded on the chip.

According to the present invention, it is possible to increase the number of chips that can be shipped. The reason is as follows.

First, considered is the case of the conventional technique in which respective tasks are allocated to respective cores in sequence. In the conventional technique, since the allocation is made by pulling out the tasks on one by one basis, a plurality of tasks linked to one another through an execution time restriction cannot be migrated simultaneously. This prevents an allocation allowing a chip to be shipped from being obtained, resulting in discard of chips. On the other hand, according to the present invention, by changing the task allocation, it is possible to increase the number of chips that can be shipped.

An example will be described using FIG. 7. In the conventional technique, allocation is sequentially made from the initial, and T16 is attempted to be migrated to (0,0). In this case, the communication time period between T16 and T17 exceeds the restricted communication time period, with the result that the execution time restriction cannot be satisfied. Therefore, according to the conventional technique, the migration of T16 is abandoned. This prevents an allocation allowing a chip to be shipped from being found, resulting in discard of a chip.

As a single uniform criterion applied throughout all the cores on all the chips, a maximum operating frequency of 1,000 MHz is set. In the method in which a single uniform criterion is applied throughout all the cores on all the chips, this chip is discarded. On the other hand, according to the present invention, a contrivance made to the task allocation allows this chip to be shipped.

In the method in which one core is used as a redundant core, this chip is discarded in this task allocation example. This is because that a core on which task T16 should operate is broken down. On the other hand, according to the present invention, a contrivance made to the task allocation allows this chip to be shipped.

In markets where the amount of high-grade products for sale is small or where there is no demand of low-grade products to be shipped, a method in which a chip having the defective cores is shipped as low-grade product cannot be employed, so that this chip is discarded. On the other hand, according to the present invention, a contrivance made to the task allocation allows this chip to be shipped.

Further, according to the present invention, by using a simultaneous linear inequality, it is possible to inclusively search for the allocation where the chip can be shipped.

A configuration may be considered in which the allocation method is executed on a computer, and the determined allocation is utilized in a scheduler of a program which is recorded on a computer readable medium. The scheduler may be one that is mounted on a processor. The scheduler is achieved by software, hardware, or a combination thereof.

Further, a configuration may be considered in which an allocation device that executes the allocation method is mounted on a processor, and the allocation device executes the allocation method when the program is executed.

Further, a configuration may be considered in which an allocation device that executes the allocation method is mounted on an IC chip in a computer other than a processor, and the allocation device executes the allocation method when the program is executed.

Although the representative embodiment of the present invention has been described in detail, it should be understood that various changes, substitutions and alternatives can be made therein without departing from the sprit and scope of the present invention as defined by the appended claims. Further, it is the inventor's intent to retain all the equivalents of the claimed invention even if the claims are amended during proceedings.

INDUSTRIAL APPLICABILITY

The present invention can be utilized for increasing the yield of processors each having a plurality of cores.

REFERENCE SIGNS LIST

101: Processing unit
110: Core performance restricting condition/task position restricting condition generation section
201 to 205: Storage unit
210: Application task group
220: Core performance restricting condition/task position restricting condition
230: Measured core performance
240: shipment allowance determination result
250: Task allocation
501: Processing unit
510: shipment allowance determination/task allocation generation section

The invention claimed is:

1. A task group allocation method that allocates, to a processor having a plurality of cores, task groups included in an application executed by the processor, comprising:
a step of measuring performances of the cores and disposition patterns, inherent to the manufacturing, of the cores after manufacture and before shipment of a chip including the processor or measuring performances of the cores and disposition patterns, inherent to the manufacturing, of the cores when a breakdown is detected by zero-performance of the chip at time of use of the chip;
a step of generating a restricting condition that associates the measured core performances and core disposition patterns with information indicating whether the application can be executed;
a step of, with reference to the restricting condition, reallocating, to the cores, the task groups in an order specified in the application that have previously been allocated to the cores;
a step of creating equations each describing a condition that one task group is allocated to only one core;
a step of creating equations each describing a condition that a number of task groups to be allocated to one core is zero or one;
a step of creating equations each representing a coordinate of each core;
a step of creating equations each representing a distance between cores;
a step of creating equations each describing that the sum of terms, indicating a completion time of a task group plus a communication time between two task groups, obtained by multiplying a parameter indicating to which core a task is allocated by a predetermined multiplier is not larger than a maximum tolerable finish time in each communication between task groups; and
a step of simultaneously solving the above equations so as to determine a core to which each task group is allocated.

2. The task group allocation method according to claim 1, wherein in the step of reallocation, each task group that has been allocated to predetermined cores under a condition that the cores on the processor operate at a design speed is reallocated so that inter-task communication can be achieved under an actual speed of the cores on the processor even if a start time point of each task group is not changed.

3. The task group allocation method according to claim 1, wherein the predetermined multiplier is a number obtained by adding a delay time in inter-core communication to a measured execution time obtained by dividing the number of cycles required for a predetermined ordinal task included in a task group to be completed by the measured maximum operating frequency of a core to which the task is allocated.

4. The task group allocation method according to claim 1, wherein the maximum tolerable finish time point is a time point obtained by adding a delay time and a tolerance time in inter-core communication to a designed execution time obtained by dividing the number of cycles required for a predetermined ordinal task included in a task group to be completed by the designed maximum operating frequency of a core to which the task has been allocated in the initial stage.

5. A task group allocation device that allocates, to a processor having a plurality of cores, task groups included in an application executed by the processor, comprising:
a hardware-implemented unit for measuring performances of the cores and disposition patterns, inherent to the manufacturing, of the cores after manufacture and before shipment of a chip including the processor or measuring performances of the cores and disposition patterns, inherent to the manufacturing, of the cores when a breakdown is detected by zero-performance of the chip at time of use of the chip, for generating a restricting condition that associates the measured core performances and core disposition patterns with information indicating whether the application can be executed;
a hardware-implemented unit for reallocating, to the cores, the task groups in an order specified in the application that have previously been allocated to the cores, with reference to the restricting condition;
a hardware-implemented unit for creating equations each describing a condition that one task group is allocated to only one core;
a hardware-implemented unit for creating equations each describing a condition that a number of task groups to be allocated to one core is zero or one;
a hardware-implemented unit for creating equations each representing a coordinate of each core;
a hardware-implemented unit for creating equations each representing a distance between cores;
a hardware-implemented unit for creating equations each describing that the sum of terms, indicating a completion time of a task group plus a communication time between two task groups, obtained by multiplying parameter indicating to which core a task is allocated by a predetermined multiplier is not larger than a maximum tolerable finish time in each communication between task groups; and a hardware-implemented unit for simultaneously solving the above equations so as to determine a core to which each task group is allocated.

6. The task group allocation device according to claim 5, wherein the hardware-implemented unit for reallocation reallocates each task group that has been allocated to predetermined cores under a condition that the cores on the processor operate at a design speed so that inter-task communication can be achieved under an actual speed of the core on the processor even if a start time point of each task group is not changed.

7. The task group allocation device according to claim 5, wherein the predetermined multiplier is a number obtained by adding a delay time in inter-core communication to a measured execution time obtained by dividing the number of cycles required for a predetermined ordinal task included in a task group to be completed by the measured maximum operating frequency of a core to which the task is allocated.

8. The task group allocation device according to claim 5, wherein the maximum allowable finish time point is a time point obtained by adding a delay time and a tolerance time in inter-core communication to design an execution time obtained by dividing the number of cycles required for a predetermined ordinal task included in a task group to be completed by the maximum design operating frequency of a core to which the task has been allocated in the initial stage.

9. A non-transitory computer-readable medium, on which a task group program is recorded, said program causing a computer to function as a task group allocation device that allocates, to a processor having a plurality of cores, task groups included in an application executed by the processor, said task group allocation device comprising:

a unit for measuring performances of the cores and disposition patterns, inherent to the manufacturing, of the cores after manufacture and before shipment of a chip including the processor or measuring performances of the cores and disposition patterns, inherent to the manufacturing, of the cores when a breakdown is detected by zero-performance of the chip at time of use of the chip, generating a restricting condition that associates the measured core performances and core disposition patterns with information indicating whether the application can be executed; and a unit for reallocating, to the cores, the task groups in an order specified in the application that have previously been allocated to the cores, with reference to the restricting condition;

a unit for creating equations each describing a condition that one task group is allocated to only one core;

a unit for creating equations each describing a condition that a number of task groups to be allocated to one core is zero or one;

a unit for creating equations each presenting a coordinate of each core;

a unit for creating equations each representing a distance between cores;

a unit for creating equations each describing that the sum of terms indicating a completion time of a task group plus a communication time between two task groups, obtained by multiplying a parameter indicating to which core a task is allocated by a predetermined multiplier is not larger than a maximum tolerable finish time in each communication between task groups; and a unit for simultaneously solving the above equations so as to determine a core to which each task group is allocated.

10. The non-transitory computer-readable medium according to claim 9, wherein the unit for reallocation reallocates each task group that has been allocated to predetermined core under a condition that the cores on the processor operate at a design speed so that inter-task communication can be achieved under the actual speed of the core on the processor even if a start time point of each task group is not changed.

11. The non-transitory computer-readable medium according to claim 9, wherein the predetermined multiplier is a number obtained by adding a delay time in inter-core communication to a measured execution time obtained by dividing the number of cycles required for a predetermined ordinal task included in a task group to be completed by the measured maximum operating frequency of a core to which the task is allocated.

12. The non-transitory computer-readable medium according to claim 9, wherein the maximum allowable finish time point is a time point obtained by adding a delay time and a tolerance time in inter-core communication to design an execution time obtained by dividing the number of cycles required for a predetermined ordinal task included in a task group to be completed by the maximum design operating frequency of a core to which the task has been allocated in the initial stage.

13. A processor to which task groups are allocated by the task group allocation method that allocates, to a processor having a plurality of cores, task groups included in an application executed by the processor, comprising:

a step of measuring performances of the cores and disposition patterns, inherent to the manufacturing, of the cores after manufacture and before shipment of a chip including the processor or measuring performances of the cores and disposition patterns, inherent to the manufacturing, of the cores when a breakdown is detected by zero-performance of the chip at time of use of the chip;

a step of generating a restricting condition that associates the measured core performances and core disposition patterns with information indicating whether the application can be executed;

a step of, with reference to the restricting condition, reallocating, to the cores, the task groups in an order specified in the application that have previously been allocated to the cores; a step of creating equations each describing a condition that one task group is allocated to only one core;

a step of creating equations each describing a condition that a number of task groups to be allocated to one core is zero or one;

a step of creating equations each representing a coordinate of each core;

a step of creating equations each representing a distance between cores;

a step of creating equations each describing that the sum of terms indicating a completion time of a task group plus a communication time between two task groups, obtained by multiplying a parameter indicating to which core a task is allocated by a predetermined multiplier is not larger than a maximum tolerable finish time in each communication between task groups; and a step of simultaneously solving the above equations so as to determine a core to which each task group is allocated.

14. A semiconductor device filtering method wherein a semiconductor device having the plurality of cores that can be shipped is determined using the task group allocation method that allocates, to a processor having a plurality of cores, task groups included in an application executed by the processor, comprising:

a step of measuring performances of the cores and disposition patterns, inherent to the manufacturing, of the cores after manufacture and before shipment of a chip including the processor or measuring performances of the cores and disposition patterns, inherent to the manufacturing, of the cores when a breakdown is detected by zero-performance of the chip at time of use of the chip;

a step of generating a restricting condition that associates the measured core performances and core disposition patterns with information indicating whether the application can be executed;

a step of, with reference to the restricting condition, reallocating, to the cores, the task groups in an order specified in the application that have previously been allocated to the cores; a step of creating equations each describing a condition that one task group is allocated to only one core;

a step of creating equations each describing a condition that a number of task groups to be allocated to one core is zero or one;

a step of creating equations each representing a coordinate of each core;

a step of creating equations each representing a distance between cores;

a step of creating equations each describing that the sum of terms, indicating a completion time of a task group plus a communication time between two task groups, obtained by multiplying a parameter indicating to which core a task is allocated by a predetermined multiplier is not larger than a maximum tolerable finish time in each communication between task groups; and a step of simultaneously solving the above equations so as to determine a core to which each task group is allocated.

15. A processor comprising the task group allocation device that allocates, to a processor having a plurality of cores, task groups included in an application executed by the processor, comprising:

a hardware-implemented unit for measuring performances of the cores and disposition patterns, inherent to the manufacturing, of the cores after manufacture and before shipment of a chip including the processor or measuring performances of the cores and disposition patterns, inherent to the manufacturing, of the cores when a breakdown is detected by zero-performance of the chip at time of use of the chip, for generating a restricting condition that associates the measured core performances and core disposition patterns with information indicating whether the application can be executed;

a hardware-implemented unit for reallocating, to the cores, the task groups in an order specified in the application that have previously been allocated to the cores with reference to the restricting condition;

a hardware-implemented unit for creating equations each describing a condition that one task group is allocated to only one core;

a hardware-implemented unit for creating equations each describing a condition that a number of task groups to be allocated to one core is zero or one;

a hardware-implemented unit for creating equations each representing a coordinate of each core;

a hardware-implemented unit for creating equations each representing a distance between cores;

a hardware-implemented unit for creating equations each describing that the sum of terms, indicating a completion time of a task group plus a communication time between two task groups, obtained by multiplying parameter indicating to which core a task is allocated by a predetermined multiplier is not larger than a maximum tolerable finish time in each communication between task groups; and a hardware-implemented unit for simultaneously solving the above equations so as to determine a core to which each task group is allocated.

16. A computer comprising the task group allocation device that allocates, to a processor having a plurality of cores, task groups included in an application executed by the processor, comprising:

a hardware-implemented unit for measuring performances of the cores and disposition patterns, inherent to the manufacturing, of the cores after manufacture and before shipment of a chip including the processor or measuring performances of the cores and disposition patterns, inherent to the manufacturing, of the cores when a breakdown is detected by zero-performance of the chip at time of use of the chip, for generating a restricting condition that associates the measured core performances and core disposition patterns with information indicating whether the application can be executed;

a hardware-implemented unit for reallocating, to the cores, the task groups in an order specified in the application that have previously been allocated to the cores, with reference to the restricting condition;

a hardware-implemented unit for creating equations each describing a condition that one task group is allocated to only one core;

a hardware-implemented unit for creating equations each describing a condition that a number of task groups to be allocated to one core is zero or one;

a hardware-implemented unit for creating equations each representing a coordinate of each core;

a hardware-implemented unit for creating equations each representing a distance between cores;

a hardware-implemented unit for creating equations each describing that the sum of terms, indicating a completion time of a task group plus a communication time between two task groups, obtained by multiplying parameter indicating to which core a task is allocated by a predetermined multiplier is not larger than a maximum tolerable finish time in each communication between task groups; and a hardware-implemented unit for simultaneously solving the above equations so as to determine a core to which each task group is allocated.

* * * * *